Figure 1:
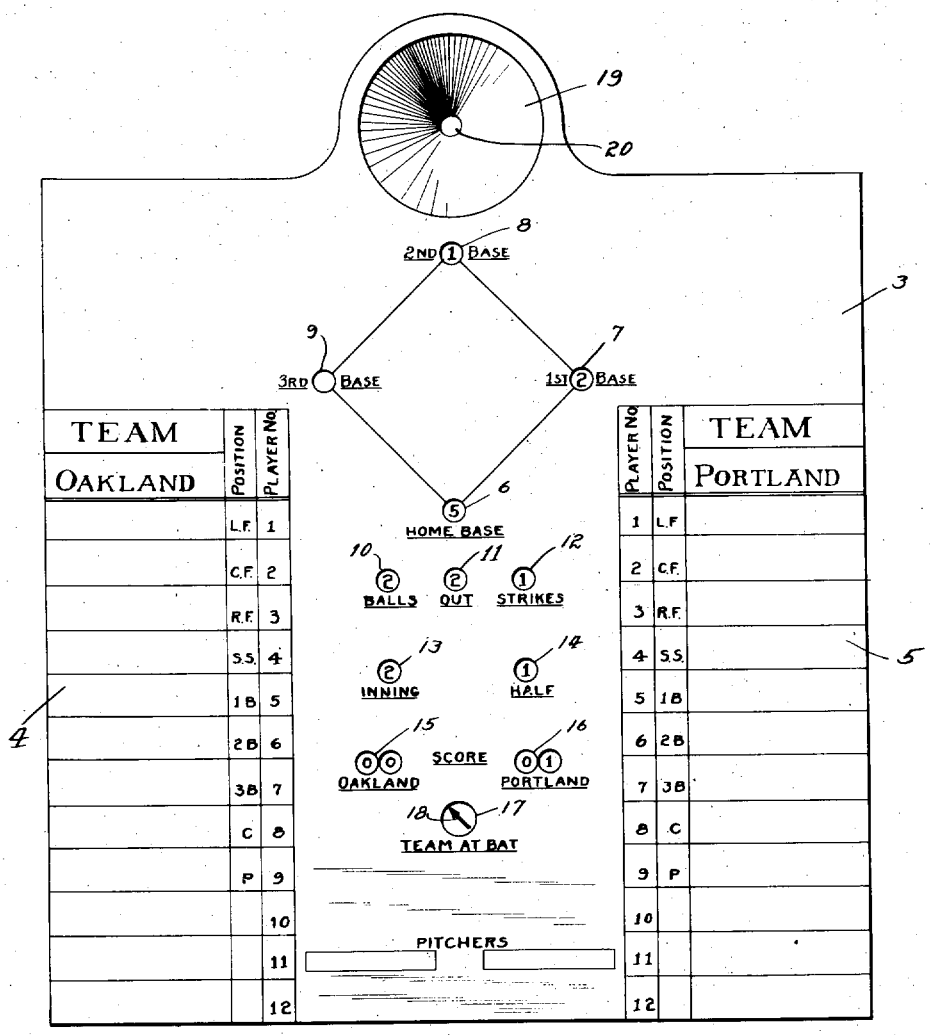

R. H. LONG.

REGISTERING SYSTEM.

APPLICATION FILED JULY 28, 1913.

Reissued Mar. 31, 1914.

13,707.

2 SHEETS—SHEET 1.

WITNESSES:

Dwight B. Cheever

Etta L. White

INVENTOR

RICHARD H. LONG

BY

A. L. Gragg

ATTORNEY

R. H. LONG.

REGISTERING SYSTEM.

APPLICATION FILED JULY 28, 1913.

Reissued Mar. 31, 1914.

13,707.

2 SHEETS—SHEET 2.

WITNESSES:

Dwight B. Cheever

Etta L. White

INVENTOR

RICHARD H. LONG

BY G. L. Gragg

ATTORNEY

UNITED STATES PATENT OFFICE.

RICHARD H. LONG, OF OAKLAND, CALIFORNIA.

REGISTERING SYSTEM.

13,707. Specification of Reissued Letters Patent. Reissued Mar. 31, 1914.

Original No. 1,055,929, dated March 11, 1913, Serial No. 684,936. Application for reissue filed July 28, 1913. Serial No. 781,684.

*To all whom it may concern:*

Be it known that I, RICHARD H. LONG, citizen of the United States, residing at Oakland, in the county of Alameda and State of California, have invented certain new and useful Improvements in Registering Systems, of which the following is a specification.

My present invention relates to registering or annunciating systems operated electrically and is particularly adapted for use to indicate the progress of base ball, foot ball, or other games, by characters displayed upon a suitable bulletin board.

The principal object of my invention is to provide coacting means whereby one or more bulletin boards may be operated from a central station, say situated adjacent the field where the game takes place, the bulletin boards being remote from the central station or controlling device.

Further objects of my invention are to adapt the system to operate on a minimum number of main conductors between the controlling device and mechanism at each bulletin board, and in general, to provide a system simple in construction and positive in action.

A further object of my invention is to provide in combination with the system, a telephone circuit provided with a transmitter at the controlling station and a receiver at the bulletin board, the latter being provided with a megaphone to render the voice audible at the great distance. By this arrangement statements or remarks may be transmitted to the observers at the bulletin board, directly from the field of action, and thus provide means for communicating that which cannot be indicated upon the bulletin board. By way of example, the invention is disclosed as applied to a bulletin board devised for indicating the score, various moves of players, etc., which concerns base ball, it being obvious from the following detailed description that the mechanism may be applied for use in connection with bulletin boards other than those relating to base ball, or in fact, as means for signaling at distances, without departing from the spirit of my invention.

My invention may generally be described as being an annunciator system which includes a group of annunciators located at a receiving station and each provided with means for selectively displaying signals of differing import; a selector for selecting each annunciator that is to be operated, there being electro-magnetic operating mechanism included in the annunciators and selector; and switching mechanism located at a transmitting station in controlling relation to the electro-magnetic operating mechanism of the annunciators and selector. The annunciators preferably operate in distinct collocated display fields that are individual thereto.

Figure 3:
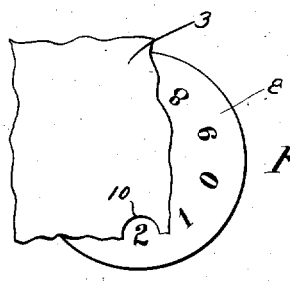
Figure 2:
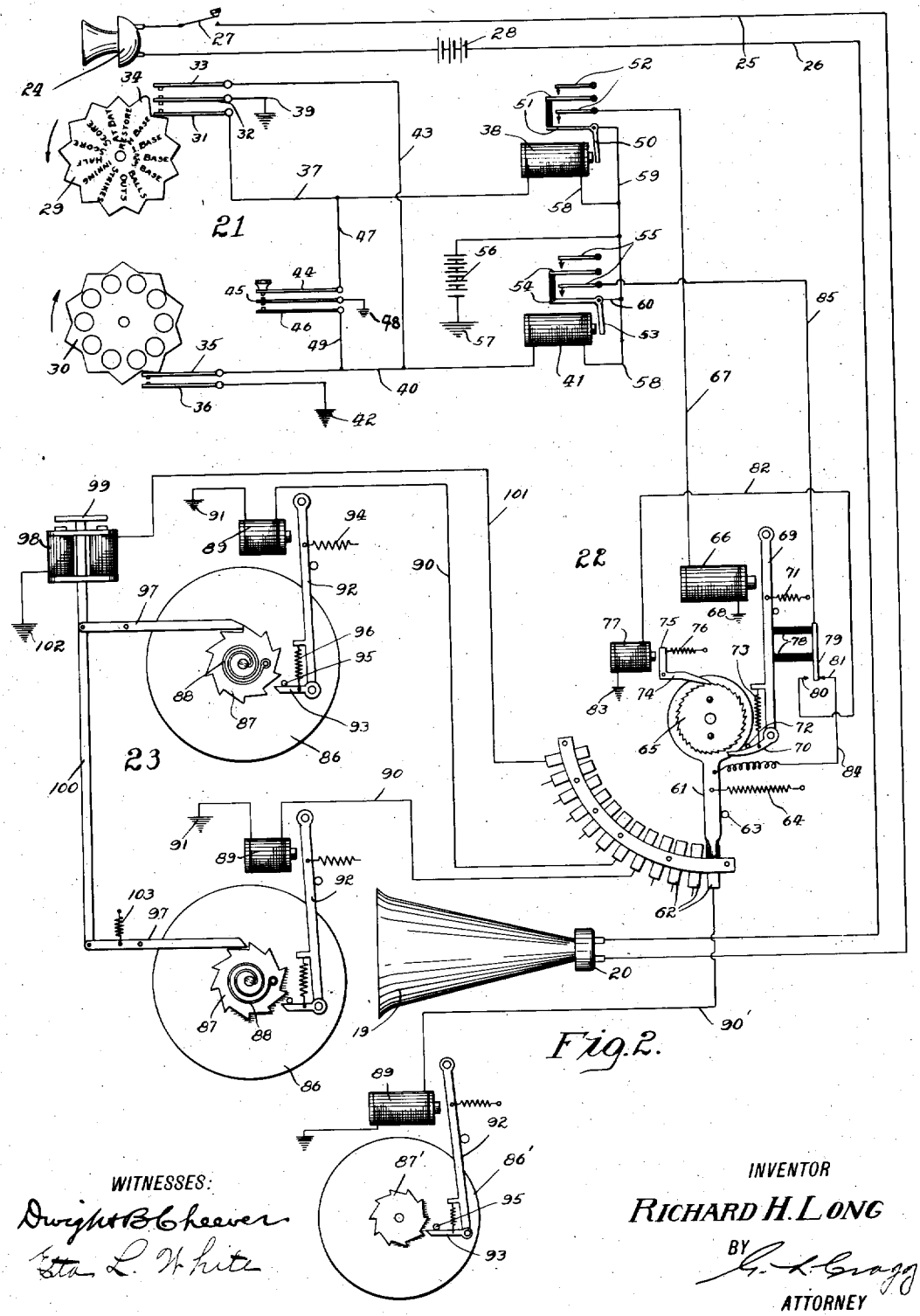

In the drawings, forming a part of this specification: Figure 1 is a front elevation of a bulletin board, embodying mechanism forming a part of my invention. Fig. 2 is a diagrammatical view of the circuit and apparatus used in connection with the system. Fig. 3 is a fragmentary portion of the bulletin board disclosed in Fig. 1, a portion of one of the indicating disks being shown in elevation.

Similar characters refer to similar parts throughout the views.

A bulletin board 3 has painted or otherwise legibly displayed thereon, the names of the two teams participating in the game, and under or in relative proximity to each named team, the names of the players may be displayed, each player having in relative proximity thereto a distinct number and preferably an abbreviation of the position which he is playing. In general, these legible characters which relate to the teams participating in the game, may be termed check means, inasmuch as certain characters, as will be subsequently described, are displayed and refer to the active player which is designated by such character. For instance, as disclosed in Fig. 1, the check device for the Oakland team is designated generally by 4, and is placed adjacent one of the lateral margins of the board, and that for Portland, by 5, disposed adjacent the other lateral margin of the board, and as an example, numeral 5 is the character referring to the person playing first base.

With the idea of simplicity and symmetry, that portion of the board between the check means 4 and 5 is provided with a plurality of apertures each of which is preferably designated legibly, as to what the character appearing at the opening, refers. That is, adjacent the top of the board a diamond is indicated with apertures designated and indicated by characters as follows: home base —6, first base —7, second base —8, third base —9. Below this diamond are groups of apertures, designated and indicated by characters as follows: balls —10, out —11, and strikes —12; innings —13, and half —14; score, Oakland —15 and Portland —16; and team at bat —17. This latter aperture has an indicator or hand 18 which is adapted to point to either the check means 4 or 5, according to the team active as is designated.

The board carries preferably at its upper end a megaphone 19 in operative relation to a receiver 20, the former enabling the sound reproduced by the receiver to be audible at a great distance.

The circuit includes three general sets of mechanism; that designated generally by 21, the operating mechanism preferably located adjacent the ball grounds; that designated by 23 indicating mechanism at the rear of the bulletin board; and, that designated 22, main switch mechanism, disposed intermediate mechanisms 21 and 23, and preferably positioned, for economical purposes, as near to mechanism 23 as possible, to reduce the resistance of conductors as will subsequently appear. Preferably adjacent the mechanism 21, I provide a transmitter 24 electrically connected with the receiver 20 through conductors 25 and 26, and a switch 27 and electric generating means 28 disposed in one of the conductors.

The mechanism 21 consists of two rotatable star wheels 29 and 30, the former having characters corresponding to those designating the apertures 6 to 17, inclusive, adjacent each tooth. The wheel 29 is adapted to act upon movable switch points 31, 32 and 33, normally out of contact with each other. One of the teeth of the star wheel 29, and more specifically that designated 34, is longer than the others and is adapted to move all of the switch points 31, 32 and 33 in contacting relation, while the other teeth are each adapted to merely contact the switch points 31 and 32. This tooth 34 is designated on the star wheel as "Restore." The star wheel 30 is adapted, by its teeth, to alternately move switch points 35 and 36 in and out of conducting relation. From switch point 31 a conductor 37 leads to an electromagnet 38, point 32 is grounded as at 39; point 35 is operatively connected by conductor 40 to a second electromagnet 41; switch point 36 is grounded, as at 42; and, switch point 33 is electrically connected with conductor 40 through conductor 43.

I may find it desirable to interpose between conductors 37 and 40 a switch device which includes switch points 44, 45, and 46, the former connected with conductor 37 through conductor 47; the switch point 45 grounded as at 48; and the point 46 connected with conductor 40 by a conductor 49. All of these points are in normally non-conducting relation but by actuation the point 44 and points 45 and 46 may be successively brought into conductive relation as is obvious from an inspection of the drawings. The contacting of points 44 and 45 serves the same purpose as the actuating of points 31 and 32, and similarly the contacting of points 44, 45 and 46 serves the same purpose as contacting the points 31, 32 and 33, through the enlarged tooth 34 of star wheel 29.

The electromagnet 38 is adapted to act upon a pivotally mounted armature 50 which carries one or more switch points 51 adapted to contact with coacting switch point or points 52 when the electromagnet is energized, and similarly, the electromagnet 41 acts upon pivotally mounted armatures 53 which carries one or more switch points 54 coacting with switch point or points 55. The plurality of switch points 51 and 52, and 53 and 54, are used when the mechanism 21 is to control a plurality of bulletin boards simultaneously, however, to simplify the disclosures, merely part of the mechanism of one bulletin board will be disclosed, the description being such that any person skilled in the art will be enabled to make, use and construct this system according to my invention.

An electric generator 56, is grounded at one pole, as at 57, and the other pole connected through branched conductor 58 to the coil of electromagnets 38 and 41, and by conductor 59 to the switch point or points 51, and conductor 60 to point or points 54.

The switching mechanism 22 comprises a pivotally mounted switch arm 61 adapted to contact with any one of a plurality of contacts 62, arranged in an arc concentric to the pivotal point of arm 61. Movement of this arm is limited in one direction by a pin 63, a tension spring 64 normally tending to retain the arm against pin 63, which, in this position, contacts with the first of the series of contacts 62. The arm 61 has operatively connected thereto a ratchet wheel 65, by which it is actuated and its movement controlled. In this mechanism an electromagnet 66 is provided, having an electrical connection 67, with the switch point 52 of the mechanism 21, the other end of the coil of this magnet being grounded as at 68. This connection 67 is one of the two essential conductors which traverse the distance between mechanism 21 and the bulletin board. The electromagnet 66 acts upon a pivotally mounted armature 69 which latter carries a pawl 70, pivotally mounted and disposed to act upon the said ratchet wheel 65. This pawl is normally held out of engagement with the ratchet wheel by a tension spring 71 which actuates armature 69 against the action of the electromagnet 66, the pawl being guided by a pin 72 and held in operative relation to the ratchet wheel by a tension spring 73. When the electromagnet 66 is energized, it draws the armature 69 against action of spring 71 and the pawl 70 actuates the ratchet wheel to move the switch arm 61 from one point to the next adjacent switch point 62, at each vibration of the armature 69. Return movement of the arm 61, responsive to spring 64, is normally prevented by a pivotally mounted pawl 74 acting upon ratchet wheel 65. This pawl is provided with an armature portion 75 and is normally retained in engagement with the ratchet wheel by tension spring 76. The arm 75 is acted upon by a second slow releasing electromagnet 77, of mechanism 22, to disengage pawl 74 when the said electro-magnet is energized.

The armature 69 carries, isolated therefrom as at 78, a switch point 79 which oscillates with the armature between two contacts 80 and 81. The contact 80, through conductor 82, is electrically connected with electromagnet 77, the latter being grounded as at 83, while conductor 81 is electrically connected by conductor 84 with switch arm 61. The switch point 79 is connected with switch point 55 of mechanism 21, through conductor 85, and the position of this point 79, when the arm 69 is not influenced by electromagnet 66, is to contact with switch point 81, and with point 80, when actuated by the said electromagnet. The conductor 85 serves as the other essential conductor between mechanism 21 and the bulletin board.

Referring now to mechanism 23, which as disclosed by way of example, includes two of the disks and instrumentality appertaining thereto. In practice, a disk for each aperture is provided, adapted to disclose characters, as shown in Fig. 3, one at a time, corresponding with those found in the check means 4 and 5, or to present numbers for keeping score. The disks 86 are rotatably mounted and are advanced independently one from another. With reference to each disk 86, and instrumentality appertaining thereto, the disk carries a ratchet wheel 87 and is acted upon by a coil spring 88 to normally position the disk with the zero characters disclosed at the front of the board 3. An electromagnet 89 for each disk is provided, electrically connected by conductors 90 to one of the points 62 of mechanism 22, and grounded as at 91. This electromagnet 89 acts upon a pivotally mounted armature 92, carrying a pawl 93 for engagement with the ratchet wheel 87. The pawl 93 is normally retained out of engagement with said ratchet wheel by spring 94 acting upon armature 92 against action of the electromagnet 89, a guide pin 95 and spring 96 positioning the pawl in operative relation to the ratchet wheel. The return movement of the disk after having been actuated by the vibration of armature 92, is normally prevented by a pawl 97 acting upon ratchet wheel 87, this pawl being under the control of an electromagnet 98, the armature 99 coacting therewith, being, through rod 100, operatively connected to the pawl 97 to disengage the same when the electromagnet 98 is energized. The latter element is electrically connected by conductor 101, to, preferably, the last switch point of mechanism 22, and is grounded as 102. I find it desirable to connect the pawls 97 of a plurality of disks to the one rod 100, in order that the plurality of disks may return to zero by merely energizing the one magnet 98. A spring 103 acting upon any one of the pawls 97 may normally retain all of the said pawls in engagement with their respective ratchet wheel.

The operation of the system is as follows:—The reading of the bulletin board as disclosed would be as follows: Oakland vs. Portland, Oakland at the bat, second inning, first half, two men out, player number 5 at the bat, with two balls and one strike. Player 2 on first base and player 1 on second base. Now suppose another ball is called on player 5, then the operation would be as follows: Wheel 29, which is located adjacent the ball grounds, is turned until the tooth of the star wheel indicating balls comes under switch point 31, this in turn closes the circuit four times from electric generator 56, conductor 58, electromagnet 38, conductor 37, switch points 31, and 32, to the ground. Each closure through electromagnet 38 pulls armature 50 in closing contact between switch points 51 and 52, thus sending four impulses from generator 56 over conductors 59, 51, 52, 67 to electromagnet 66. The latter in turn attracts its armature 69 four times causing the pawl 70 to engage ratchet wheel 65 and advance it four steps, pawl 74 preventing its return under the influence of spring 64. The switch arm 61 is now contacted with the switch point 62, which leads over conductor 90 to electromagnet 89, located adjacent to opening 10. Now by rotating wheel 30 one space, an impulse is sent through electromagnet 41 causing it to attract armature 53, thus closing the circuit through switch points 54 and 55, over conductor 85, over switch points 79 and 81, conductor 84 to switch arm 61, switch point 62 and conductor 90, and electromagnet 89. This magnet attracts its armature 92 rotating the ratchet wheel 87 one space through pawl 93, bringing numeral 3 before the opening 10. In this manner the electromagnet 89, operating in conjunction with the disk associated with the various holes in the bulletin board are selected by wheel 29 and the required number of the disk is selected by wheel 30. The tooth 34 marked "Restore" on the star wheel 29 selects the last switch points 62 of mechanism 22, thus connecting the switch arm 61 with magnet 98. This magnet is attracted to trip the pawl 97 connected with apparatus belonging to holes 7 to 13, so that at the end of each half inning these may be simultaneously set back to zero. The large tooth 34 is provided, that in passing from "Restore" to "Home base" the circuit is first completed through electromagnet 38 which in turn completes it through electromagnet 66, thus drawing the switch point 79 against switch point 80. The tooth then, on account of its extra height, also completes the circuit through electromagnet 41, which in turn completes a circuit over conductor 85, switch point 79, 80 and electromagnet 77. The latter attracts its armature drawing pawl 74 from the tooth of ratchet wheel 65. When the tooth 34 passes from under switch point 31, and the circuits through magnets 38 and 41 are opened, magnet 66 immediately releases its armature, withdrawing pawl 70, thus allowing the ratchet 65 and switch arm 61 to return to the first switch point 62 under the pull of spring 64. Pawl 74 during this time is held from the ratchet on account of electromagnet 77 which is wound to produce a slow release of its armature. The disks 86[1] adjacent to openings 13 to 17 inclusive are set back to zero only at the end of each game and hence are not provided with means for returning to zero. To bring these disks to zero they are rotated forward by the action of wheel 30 until the zero is again shown through the respective opening.

From the foregoing, it is made manifest that I provide a system with a central or operating station, which is capable of controlling a number of bulletin boards by merely adding to the number of contact points 51 and 52, and 54 and 55, with main conductors such as 67 and 85 to each bulletin board including mechanism 22 and 23.

I claim:—

1. A registering system of the character described comprising in combination, a plurality of devices movable for successively displaying characters, a plurality of mechanisms, one for each of said devices, electrically vibratable for actuating the same independently one from another, a switch having a plurality of points each independently and electrically connected to a separate one of said last mentioned mechanisms, mechanism for actuating said switch to form an electric conducting contact with any one of the switch points thereof, an electric generator, and switching instrumentality for making or breaking an electric circuit, including said generator and passing through the said electrically vibratable mechanism any number of times for actuating the said device associated therewith and controlled by said switch, substantially as and for the purpose set forth.

2. A registering system of the character described comprising in combination, a plurality of revoluble disks adapted to successively display characters, ratchet wheels carried by said disks, an electromagnet for each disk, a pawl for each disk adapted to be actuated upon energizing said electromagnet to act upon the respective ratchet wheel of the disk for advancing the same, a switch having a plurality of points each independently and electrically connected to one of said electromagnets of said disks, mechanism for actuating said switch to form an electric conducting contact with any one of the switch points thereof, an electric generator, and switching instrumentality for completing an electric circuit including said generator and passing through the said electromagnet any number of times controlled by said switch, for actuating the disk associated therewith, substantially as and for the purpose set forth.

3. A registering system of the character described comprising in combination, a plurality of revoluble disks adapted to successively display characters, ratchet wheels carried by said disks, an electromagnet for each disk, a pawl for each disk adapted to be actuated upon energizing the electromagnet to act upon the respective ratchet wheel of the disk for advancing the same, means normally preventing movement of said ratchet wheels reverse to that imparted thereto by said pawls, electrically operable means for releasing said last mentioned means, a switch having a plurality of points independently and electrically connected to the said electromagnets of said disks, mechanism for actuating said switch to form an electric conducting contact with any one of the switch points thereof, an electric generator, an instrumentality for completing an electric circuit including said generator and passing through the said electromagnet controlled by said switch, for actuating the disks associated therewith, substantially as and for the purpose set forth.

4. A registering system of the character described comprising in combination, a plurality of devices movable for successively displaying characters, means electrically vibratable for actuating said devices independently one from another, a switch having a plurality of points independently and electrically connected to said last mentioned means and an oscillatable arm, a ratchet wheel carried by said arm of said switch, an electromagnet, a pawl adapted to act upon said ratchet wheel of said switch and actuated by the energy of said electromagnet to advance the said arm point by point at each vibration of said pawl, an electric generator, and instrumentality for completing an electric circuit including said generator and passing through the said electrically vibratable means for actuating the said device associated therewith and controlled by said switch, substantially as and for the purpose set forth.

5. A registering system of the character described comprising in combination, a plurality of devices movable for successively displaying characters, means electrically vibratable for actuating said devices independently one from another, a switch having a series of points independently and electrically connected to said last mentioned means and an oscillatable arm, a ratchet wheel carried by said arm of said switch, an electromagnet, a pawl adapted to act upon said ratchet wheel of said switch arm and actuated by energy of said electromagnet, to advance the said arm point by point at each vibration of said pawl, means for returning said switch arm to a position contacting with the first switch point of the series, an electric generator, and instrumentality for completing an electric circuit in said generator and passing through the said electrically vibratable means for actuating said device associated therewith and controlled by said switch, substantially as and for the purpose set forth.

6. A registering system of the character described comprising in combination, a plurality of revoluble disks adapted to successively display characters, ratchet wheel carried by each of said disks, a spring for normally returning said disks to a predetermined position, an electromagnet for each of said disks, an armature for each of said electromagnets, pawl mechanism carried by said armatures adapted to act upon said ratchet wheels and their respective disks, upon energizing the electromagnets associated therewith, second pawl mechanism acting upon the said ratchet wheels to normally prevent movement of said disks responsive to said spring, an auxiliary electromagnet, an armature therefor operatively connected to said second mentioned pawl mechanism to actuate the same releasing said disks when the said electromagnet is energized, and switching means for conducting an electric circuit through any one of said electromagnets, substantially as and for the purpose set forth.

7. A registering system of the character described comprising in combination, an oscillatable switch arm, switch points disposed to be successively contacted with said oscillatable arm, yieldable means for normally retaining said arm at a predetermined position with respect to said points, a ratchet wheel carried by said arm, an electromagnet, a vibratable armature therefor, pawl mechanism carried by said armature to act upon said ratchet wheel to advance said arm, a second electromagnet, an armature therefor, a pawl carried by said armature acting upon said ratchet wheel to normally prevent movement of said arm responsive to said yieldable means, a switch point electrically connected with said switch arm to conduct an electric circuit through any one of said switch points, a second switch point spaced apart from said first mentioned switch point and electrically connected with said second mentioned electromagnet, a third switch point movable intermediate said first and second mentioned switch points, carried in an insulated manner by said armature of said first mentioned electromagnet and contacting with said first mentioned switch point when the said armature is not influenced by its electromagnet, a plurality of electrically operable devices adapted to successively display characters and having an electrical connection with one of the switch points, an electric generator, a controlling device electrically connected with said generator and said first mentioned electromagnet to energize the same when desired, and a second controlling device electrically connecting said generator and second mentioned electromagnet to energize the same when desired, substantially as and for the purpose set forth.

8. A registering system of the character described comprising in combination, a star wheel having one tooth relatively longer than the other, a switch point adapted to be moved by any one of the teeth of said wheel, a second switch point adapted to contact with said first mentioned switch point when the latter is moved by a tooth of said star wheel, said second mentioned switch point being grounded and adapted to be actuated through action of said relatively longer tooth of said star wheel, a third switch point adapted to be contacted by said second mentioned switch point when the latter is actuated through influence of said relatively larger tooth of said star wheel, two independent electromagnets, a vibratable armature for each magnet, a switch member actuated by each of said armatures, a second switch member for coaction with the teeth of said first mentioned switch members to contact when their respective armature is actuated responsive to energy of its electromagnet, a conductor connecting said first mentioned switch point and one of said electromagnets, a second star wheel, a pair of switches adapted to be contacted by the teeth of said second mentioned star wheel, one of said points being rounded, a conductor connecting the other switch points of said second mentioned star wheel with the other electromagnet, an electric generator grounded at one pole, a conductor connected to said electromagnet and to the switch members carried by the armatures thereof, a conductor connecting said third mentioned switch point and the conductor between the switch member of said second mentioned star wheel and electromagnet, an electrically operated switch device having a plurality of points, operatively connected to the second mentioned switch member of said electromagnet operatively connected with said first mentioned switch point to be operated upon completing an electric circuit therethrough, a plurality of electrically operated devices each adapted to successively display characters, and having an electrical connection with one of the switch points of said electrically operated switch, and means operatively connecting the second mentioned switch member of the said electromagnet connected with the switch point of said second mentioned star wheel to conduct a current through the electrically operated switch point and display device in electrical connection therewith, substantially as and for the purpose set forth.

9. An annunciator system including a group of annunciators having distinct collocated display fields individual thereto and located at a receiving station and each provided with means for selectively displaying signals of differing import; a selector for selecting each annunciator that is to be operated, there being electro-magnetic operating mechanism included in the annunciators and selectors; and switching apparatus located at a transmitting station in controlling relation to the electro-magnetic operating mechanism of the annunciators and selector, there being means controlled at the transmitting station for restoring the annunciators to normal or initial positions.

In testimony whereof I affix my signature in presence of two witnesses.

RICHARD H. LONG.

Witnesses:
HANSFORD B. GRIFFITH,
ETHEL R. SCHMITT.